J. L. MORRIS.
CASH REGISTER.
APPLICATION FILED JULY 9, 1913.

1,101,317.

Patented June 23, 1914.
8 SHEETS—SHEET 1.

Inventor
Joshua L. Morris

UNITED STATES PATENT OFFICE.

JOSHUA L. MORRIS, OF COUNCIL BLUFFS, IOWA.

CASH-REGISTER.

1,101,317.  Specification of Letters Patent.  Patented June 23, 1914.

Application filed July 9, 1913. Serial No. 778,039.

*To all whom it may concern:*

Be it known that I, JOSHUA L. MORRIS, a citizen of the United States, and a resident of Council Bluffs, in the county of Pottawattamie and State of Iowa, have invented certain new and useful Improvements in Cash-Registers; and I do hereby declare that the following is a full, clear, and exact description thereof, reference being had to the accompanying drawings, and to the letters of reference marked thereon, which form a part of this specification.

This invention relates to an improvement in cash registers and consists of the matters hereinafter described and more particularly pointed out in the appended claims.

The object of the invention is to provide a cash register of simple and economical construction, having the usual check strips for "cash," "charge," "received on account" and "paid out" transactions, and having a record strip upon which a copy of each transaction is made as the check is written, and which is itself exposed at one place to receive the signature or initials of the clerk or other person making the transaction—all being so constructed and arranged that it is both impossible for said clerk or other person to withdraw from the cash register the check recording the transaction that is to be delivered to the customer and impossible for him to open the cash drawer until after he has placed his mark or initials upon the record strip.

In the drawings, Fig. 24 is a detail sectional view in a plane indicated by the line 24—24 of Fig. 5.

Figure 7:
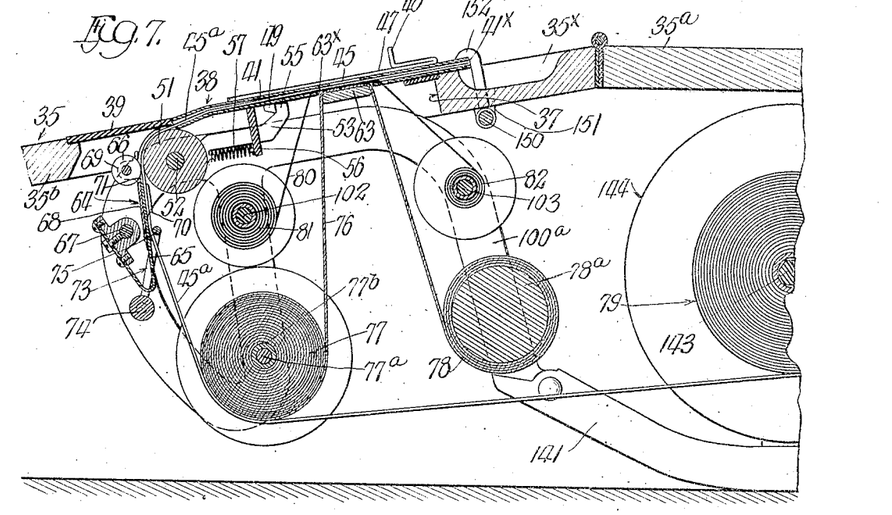
Fig. 7 is a view representing a partial vertical section through the cash register in a plane indicated by the line 7—7 of Fig. 3.
Figure 8:
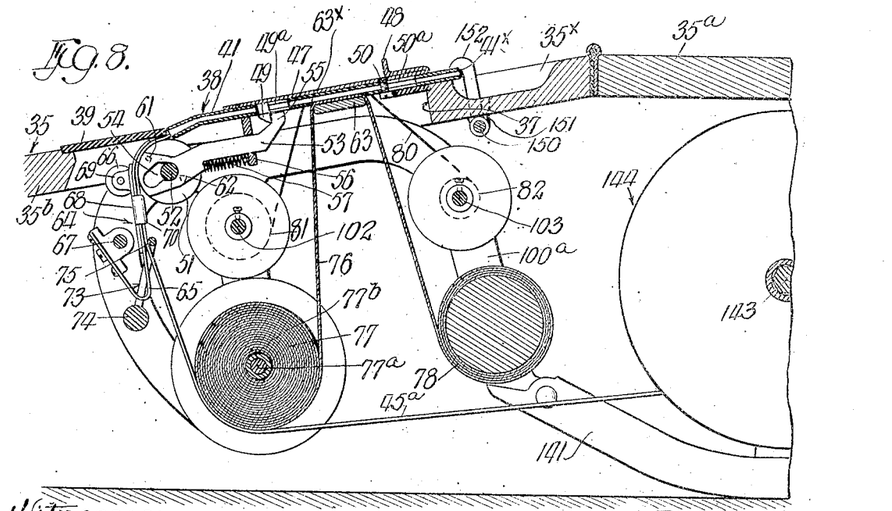
Fig. 8 is a view representing a partial vertical section through the cash register in a plane indicated by the line 8—8 of Fig. 3.

Referring now to that embodiment of the invention illustrated in the drawings, 30 indicates the box or case inclosing my improved cash register. Said box has upright front and rear walls, respectively, 31 and 32, side walls 33—33, a bottom wall 34 and a top wall 35. The top wall 35 is preferably made in two sections, a rear section 35$^a$ and a front section 35$^b$, both of which are hinged in any convenient manner to the body of the box. The rear top section 35$^a$ is made horizontal, while the front top section 35$^b$ is inclined downwardly and forwardly for convenience in writing. A cash drawer 36, capable of being withdrawn in a forward direction is provided in the bottom of the casing. The front top section 35$^b$ of the casing is cut away to leave an elongated rectangular opening 37 (see Figs. 3 and 7), which is inclosed by a metal plate 38, provided with the openings through which the check strips and a part of the record strip are exposed to view to be written upon by the one using the cash register. Said cover plate 38 comprises a fixed plate 39, extending longitudinally of the cash register casing, a fixed plate 40, extending in a forward and back direction at the right hand end of the fixed plate 39 and a hinged plate 41, which is hinged in suitable manner to the rear edge of the plate 39. The fixed plates 39 and 40 are screwed, or in any other convenient manner attached to the top section 35$^b$ of the casing, which has suitable recesses about the opening 37 to make the cover plate stand in substantially the plane of the top of the casing. The hinged cover plate 41 as shown consists of thin plates spaced apart to provide guide channels. The check strips are fed through the channels in the hinged plate 41 and when withdrawn are fed beyond the rear edge 41$^x$ of said plate which constitutes a cutting edge against which the check may be torn to detach it from its strip. The top section 35$^b$ is provided with a longitudinally extending groove 35$^x$ immediately back of the said cutting edge 41$^x$ for convenience in grasping the check.

In the hinged member 41 of the cover plate, there are a plurality of horizontally spaced slots or openings 42, 43, 44, 45 and 46, arranged in a line near the rear edge of said plate. The openings 42—45, inclusive, are provided for exposing to view check strips for the usual transactions, in this case four, namely, for "cash", "charge", "received on account" and "paid out" transactions, while the slot 46, which, as shown, is longer in a horizontal direction, is provided to expose that part of the record strip upon which the employee making the transaction is intended to write his initials or other identifying mark.

At the right of each of the horizontally arranged slots 42—45, inclusive, a slide 47 is mounted on the hinged cover plate 41. Said slide has an upright finger piece 48 and is capable of a rearward movement, that is to say, a movement in the direction that the check strips are to be fed. As will presently appear, each slide 47 is normally locked against movement, but when unlocked, is adapted to feed the check strip exposed through the opening at the left of it a short distance beyond the rear edge 41$^x$ of the hinged cover plate 41 so that enough of the check projects to be grasped by the thumb and finger. The connections and operation of all the slides 47 are the same so that a description of one will suffice.

The slide 47 is provided with fixed depending parts 49, 50, which engage in forwardly and rearwardly extending guide slots 49$^a$ and 50$^a$ formed in the cover plate 41 and which have lateral extensions for engagement with the under face of the cover plate to retain the slide in position. As shown, the one part 50$^a$ consists of a screw threaded from below through this slot into the slide, while the other part 49$^a$ consists of a lug integral with the slide and having a pin driven laterally through it below the cover plate. The slots in which said parts engage are long enough to permit a limited longitudinal movement of the slide in a rearward direction.

Figure 18:
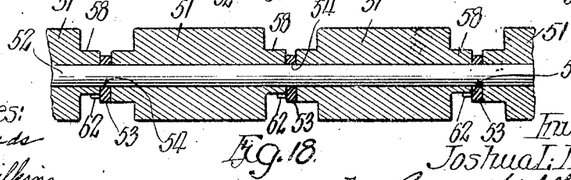
Fig. 18 is a detail view representing a section taken in the plane 18—18 of Fig. 3.

There is associated with each slide 47 a feed wheel 51 of familiar type, there being four such feed wheels, all loosely mounted on a shaft 52 (see Fig. 18) which is supported in any desirable manner in the cash register casing below the cover plate 41. Each of these feed rolls is arranged to feed a check strip in a path under one of the slots 42—45, inclusive, in the cover plate (see Fig. 18).

For each slide 47 is provided a lever 53, which is mounted on the shaft 52, in line with but below the slide 47 and next adjacent on the right to the associated feed roll 51. (See Fig. 8 and Figs. 16–18, inclusive.) The lever 53 has a cam slot 54 at its forward end, through which the shaft 52 extends, and at its rear end has a dog 55 that engages the rear side of the lug 49 on the bottom of the slide 47. The lever 53 has guiding engagement in a slot in a longitudinal bar 56 fixed to the bottom of the cover plate and a coiled expansion spring 57 engages between said bar and a part of the lever in such manner as to act to hold said lever in a forward position, in which case the slide 47 is in its most forward position.

58 indicates a cam fixed to the feed roll 51 in a plane adjacent to the lever 53, with its axis of rotation coincident with that of the feed roll. Said cam has a notch 59, and a radial shoulder 60, and oppositely disposed curved cam surfaces 59$^x$ and 60$^x$ intermediate said notch and shoulder, the first being of larger radius than the second. On the face of the lever 53 next to the said cam, there are provided lugs 61, 62, adapted for engagement respectively with said notch 59 and shoulder 60.

The operation of the slide, the associated lever, cam and feed roll is as follows: With the slide 47 in its normal position, before the associated check strip has been fed to tear of a check and withdraw it from the register, the lug 62 on the lever 53 is engaged in the notch 59 of the cam 58 (see Fig. 16), thus locking said cam, and with it the feed roll, so that it cannot rotate in either direction. The lug 61 on the lever 53 on the other hand is removed from the radial shoulder 60 with which it is adapted to engage. When the slide 47 is free to move in a rearward direction (said slide being normally locked, as has been heretofore pointed out, and the mechanism for locking which, and unlocking it, is later to be described), such movement produces a corresponding movement of the lever 53. In the first part of this movement, the lug 62 is disengaged from the cam notch 59, thereby releasing the cam while the lug 61 is brought into position to engage the cam shoulder 60, as shown in dotted lines in Fig. 16. In the balance of the movement of the lever 53, the lug 61 imparts a rotative movement to the cam 58, said movement continuing during the balance of the movement of the lever. The cam slot 54 in the lever is so shaped that in the operation of the lever, the lug 61 will travel in approximately an arcuate path and remain in operative engagement with the cam shoulder 60. The final position of the lever at the rearward limit of its movement is shown in full lines in Fig. 17. The feed roll 51 has a circumference equal to the length of the check that is to be detached from the check strip and in designing the parts they are so proportioned that the rotation of the feed roll produced by the movement of the lever will be through a sufficient angle to project the forward end of the check strip beyond the cutting edge 41$^x$ of the cover plate a distance far enough to be conveniently grasped by the thumb and forefinger. The further feed of the check strip is produced by pulling directly on the projected end thereof. When the slide 47 is released, the expansion spring 57 acts to push the lever 53 forwardly, bringing it from the position shown in full lines in Fig. 17 to the position shown in dotted lines therein. In this movement, the lug 62 of the lever comes to bear against the curved cam surface 59$^x$ of the cam 58. As the check strip is withdrawn, the feed roll is caused to rotate, and with it the cam 58. The lug 62, during this rotative movement of the cam, slides upon the cam surface 59$^x$, and then after the shoulder 60 passes it, upon the curved cam surface 60$^x$ until the notch 59 is brought around to it, whereupon it drops into said notch and again locks the cam against rotative movement, said cam and feed roll having made a complete revolution. The parts are then in their initial normal position.

Below the slots 42—46, inclusive, in the hinged cover plate, there is provided a longitudinally extending platen 63, which is supported at its ends in a suitable manner by the top section 35$^b$ of the register casing.

A long slot 63$^x$ is formed in the bottom section of the cover plate above said platen. The check strips, the ribbon and the record strip are fed over the platen 63, being arranged above the same in the order named, so that when any one of the check strips is written upon, a copy of the writing is produced upon the record strip. The check strips associated with the several slots or openings 42—45, inclusive, are indicated by 42$^a$, 43$^a$, 44$^a$, 45$^a$, respectively. Each check strip passes over an associated feed roll 51, with which it is held in frictional engagement by means of a tension device 64, consisting of a spring arm 65 and of a friction roll 66 carried thereby (see Figs. 3, 7 and 8). The several spring arms 65 are fixed on a longitudinally extending rod or bar 67, mounted in front of the feed rolls 51. Each spring arm has attached to it a plate 68 which has ears 69 to provide bearings for the friction roll 66, and lateral extensions 70 below said ears, which are bent to form flanges spaced from the rear face of the spring arm 65 to act as guides for the lateral edges of the check strip in its path toward the feed roll. The spring arms 65 are adjustably mounted on the rod 67 so that the tension of the friction rolls 66 against their respective feed rolls 51 may be adjusted as desired. The friction roll 66 projects through a slot 71 in the upper end of the arm 65, which is bent about the feed roll 66 so as to continue its guiding effect of the strip as it passes about the said feed roll. A loop 73 is fixed on a bar 74, said loop having horizontal rod 75 which acts to guide the check strip before it reaches the flanges 70, carried by the spring arm 65.

76 indicates a record strip which travels above the platen 63 in a plane below the plane below the plane of the several check strips. Said record strip is of a width nearly equal to the width of the hinged cover plate 41 and is fed from a roll 77, that is loosely mounted on a shaft 77$^a$ and is wound upon a roll 78 by means presently to be described. The check strips are fed from loosely mounted rolls 79, mounted in the rear of the casing, said strips being led forwardly below the record supply roll 77 and then forwardly of the bar 75 and thence through the guide devices heretofore described.

80 indicates a plurality of ribbons, one for each check strip, which are fed over the platen in a plane between the check strips and the record strip and which are wound and unwound from the rolls 81, 82 in a manner presently to be described.

Figures 3, 4:
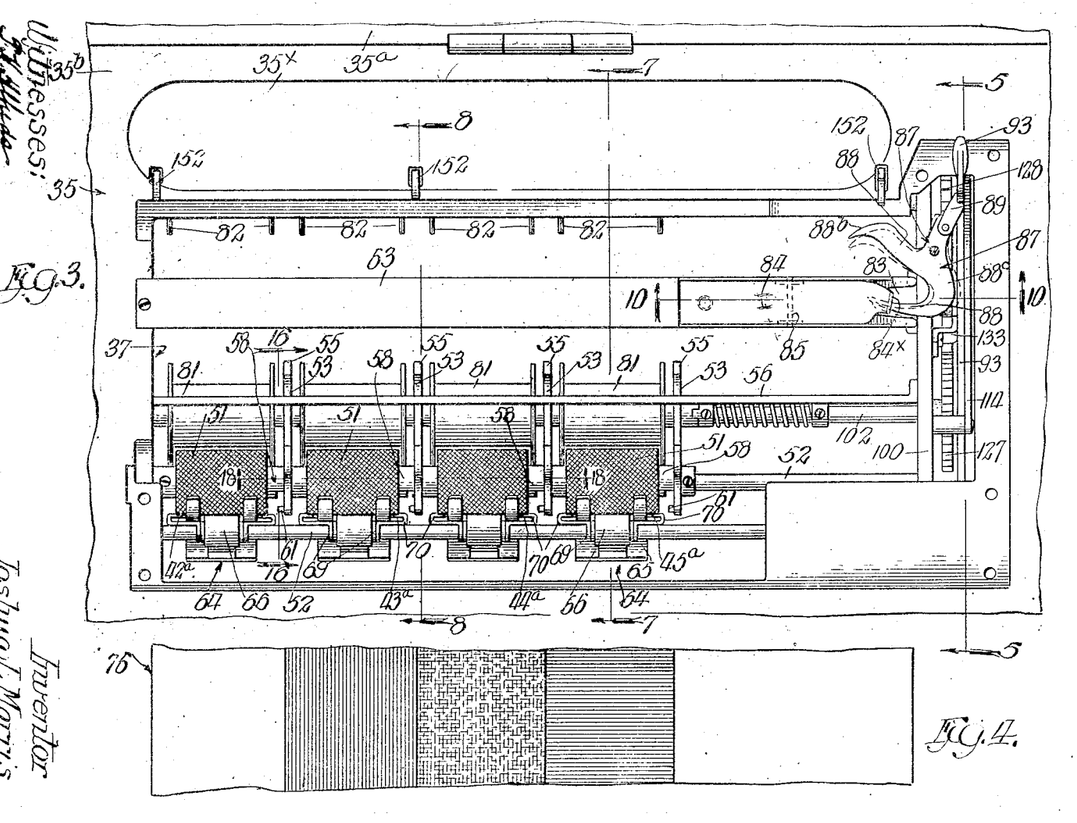
Fig. 3 is a top plan view on a still larger scale with the cover plate inclosing the check strips, the record strip and the internal mechanism removed.
Fig. 4 is a fragmentary top plan view of the record strip.
Figures 9, 10, 11, 12, 14:
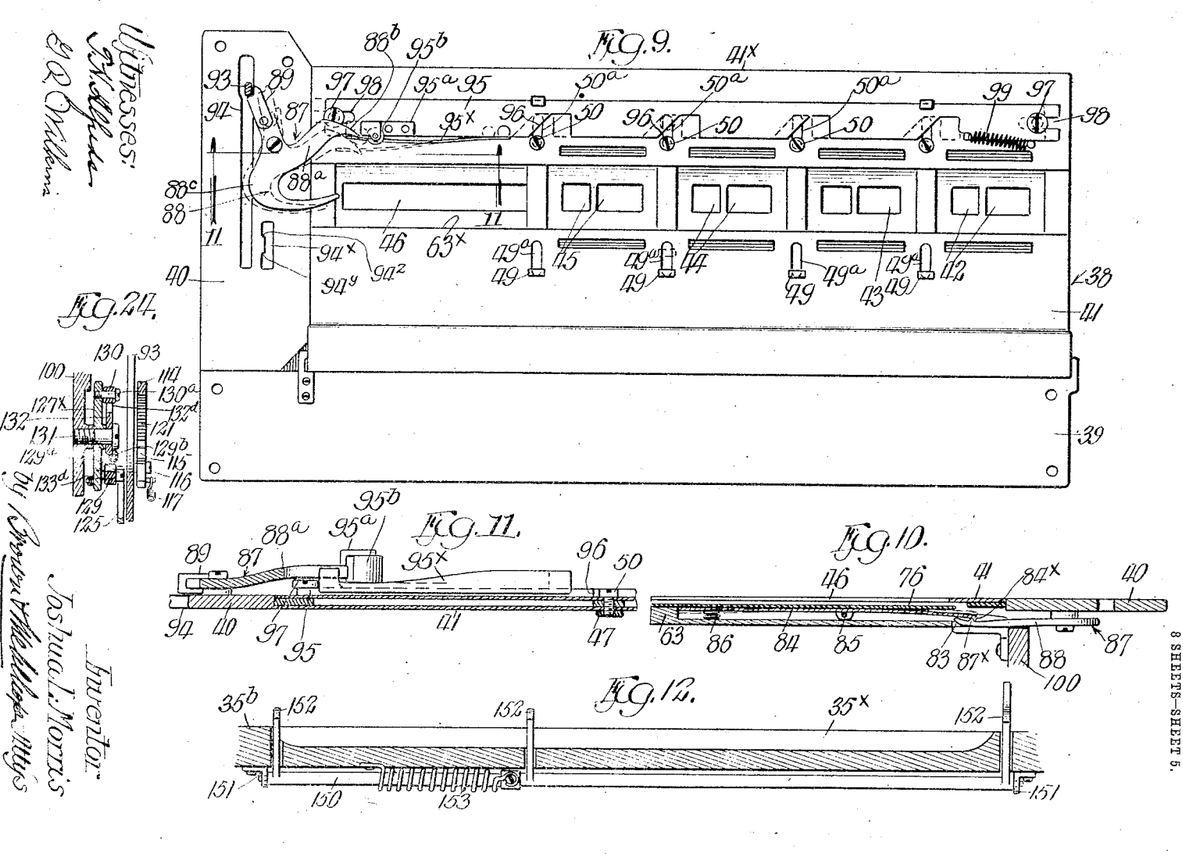
Fig. 9 is a view representing a bottom plan view of the cover plate, showing the mechanism attached thereto.
Fig. 10 is a view showing a fragmentary vertical section through the cover plate in a plane indicated by the line 10—10 of Fig. 3, the same being upon a larger scale.
Fig. 11 is a view representing a fragmentary vertical section through the cover plate in a plane indicated by the line 11—11 of Fig. 9, this scale being the same as that of the view shown in Fig. 10.
Fig. 12 is a view representing a fragmentary vertical section in a plane indicated by the line 12—12 of Fig. 5, the scale being the same as that of the view shown in Fig. 9.
Fig. 14 is a view representing a horizontal section through the cash register in a plane indicated by the line 14—14 of Fig. 13.

The platen 63 is provided at its right hand end below the slot 46 with a longitudinally extending recess 83, in which is located a flat lever plate 84 (see Figs. 3 and 10). Said lever plate in its normal position, has its top face substantially in the plane of the top face of the platen and is fulcrumed to the platen intermediate its ends at 85. A coiled spring 86 is interposed between the bottom face of the lever plate and the bottom of the recess 83, so as to normally hold the left hand end of said lever plate in its highest position. The right hand end of said lever plate has a depending detent 84$^x$.

Figure 21:
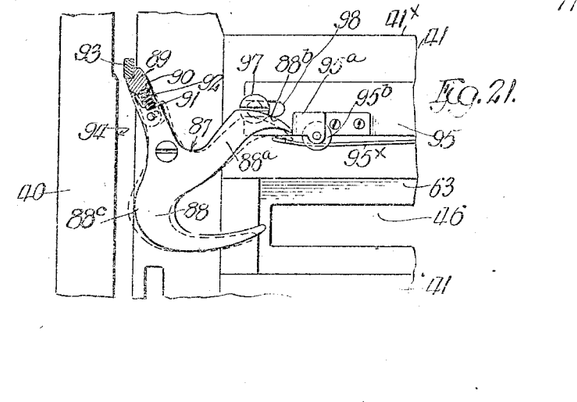
Fig. 21 is a detail plan view on an enlarged scale of the part of the mechanism illustrated in Fig. 9 at the left hand end of the same, with the movable parts in a different position.
Figure 22:
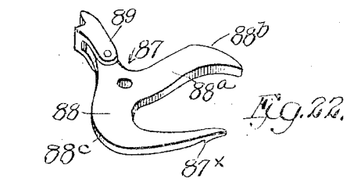
Fig. 22 is a perspective view of the trigger shown in Fig. 21.
Figure 23:
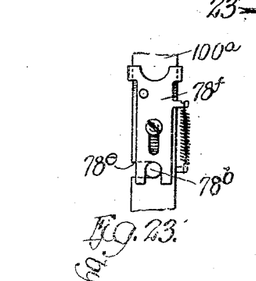
Fig. 23 is a detail end elevation of the part shown in Fig. 19, as indicated by the line 23—23.

87 indicates a trigger of peculiar shape (shown in perspective, Fig. 22) which is pivotally connected to the bottom face of the plate 40 near the detent end of the lever plate 84. Said trigger has an arm 88, that carries at its end a tooth 87$^x$, which is normally engaged by the detent 84$^x$ on the lever plate 84. The trigger 87 has a heel 89, which is not made rigid with the main body of the trigger, but consists of a separate part pivotally connected to said trigger. The trigger proper is capable of limited movement independent of the separate heel part 89, and the trigger proper and said heel part are provided with opposing shoulders 90, 91, between which is interposed a coiled spring 92 (see Fig. 21).

Figure 1:
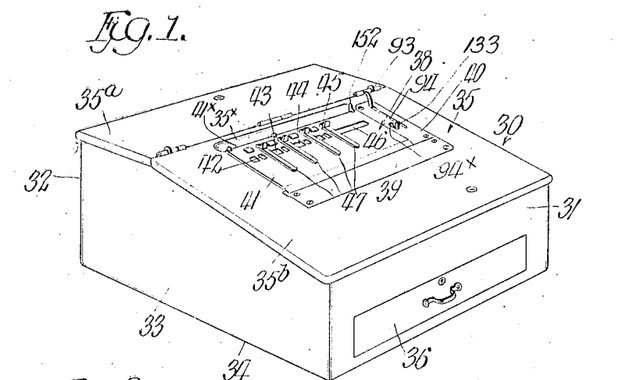
—Figure 1 is a perspective view of my improved cash register.
Figure 2:
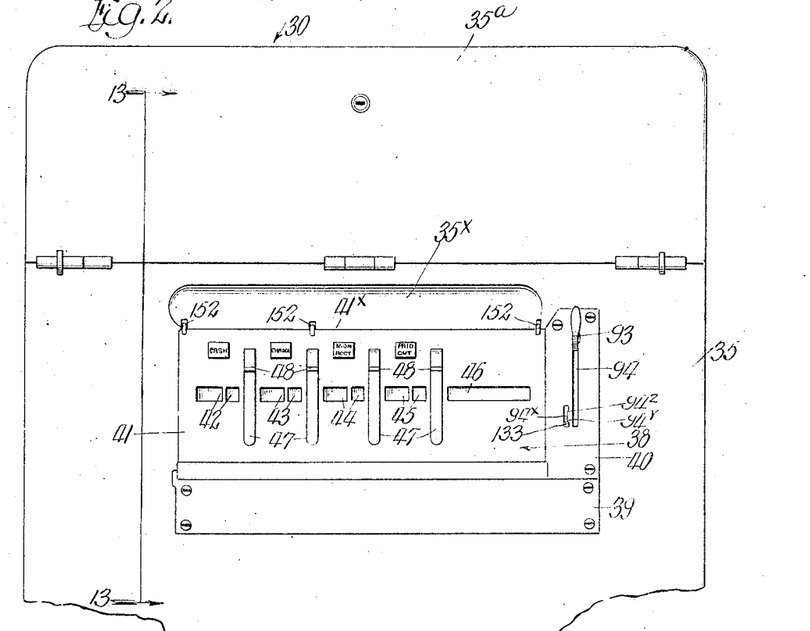
Fig. 2 is a top plan view of the same on an enlarged scale.
Figure 13:
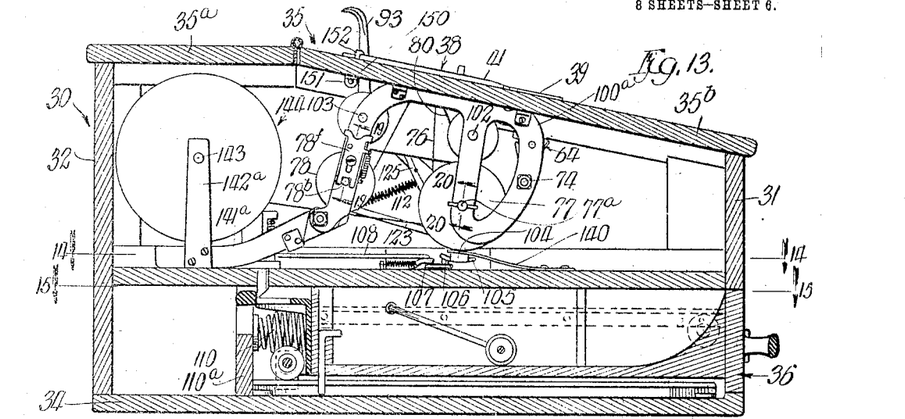
Fig. 13 is a view representing a vertical section through the cash register in a plane indicated by the line 13—13 of Fig. 2, the scale being the same as that of the view shown in Fig. 2.
Figure 14:
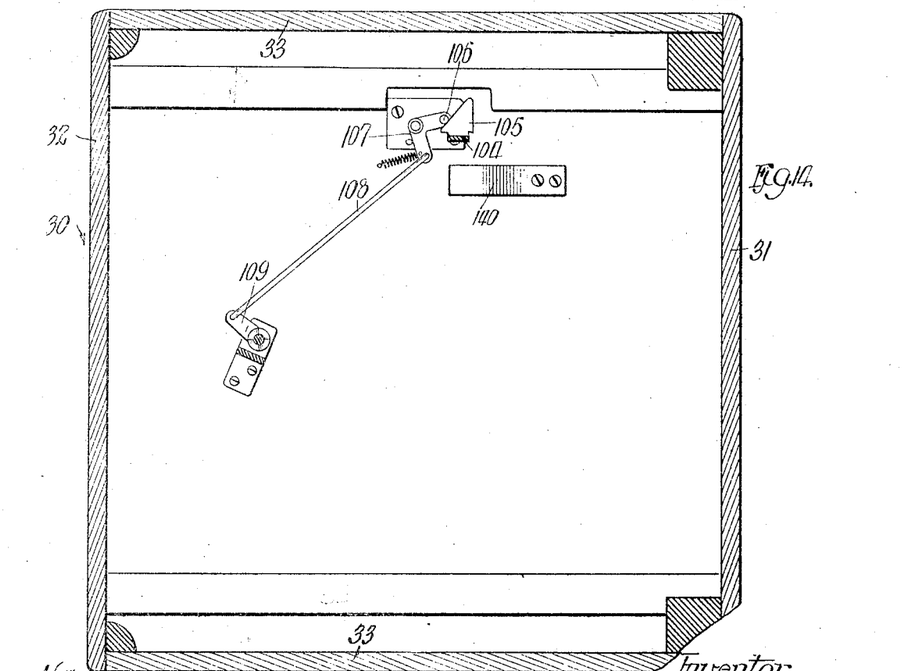

93 indicates an upright lever (see Figs. 1, 3 and 13), which controls the opening of the cash drawer and has other functions to be later described, and which is capable of swinging movement in a slot 94 formed in the forwardly and backwardly extending fixed member 40 of the cover plate. The heel part 89 of the trigger is normally engaged with said vertically arranged lever 93 so as to lock said lever against movement. The center of the pivot connecting the heel part 89 to the main part of the trigger, the center on which the trigger swings as a whole, and the coiled spring 92, together with the shoulders 90, 91, between which said spring engages,—are all so arranged that, after the detent 84$^x$ of the lever 84 has released the tooth 87$^a$ on the arm 88 of said trigger, the coiled spring 92 will cause the trigger to swing on its axis from the position shown in full lines in Fig. 21, to the position shown in dotted lines therein, while the heel part 89 itself remains in locked engagement with the lever 93.

There is attached to the bottom of the hinged cover plate 41 (see Fig. 9) at the rear of the series of slots 42, 46 therein a longitudinally movable bar 95, which is provided with a plurality of inclined cam surfaces 96,—there being one of the said cam surfaces associated with each slide 47, and said cam surface being adapted to engage the depending part 50 which forms one of the attaching and guiding devices for said slide. The bar 95 is attached to the bottom face of the cover plate by means of headed screws 97, which engage in longitudinally extending open slots 98 at the ends of the bar. A coiled spring 99 connects a fixed lug on the bar with a fixed lug or screw on the cover-plate in such manner as to hold said bar in the position nearest the right hand end of the cover-plate as looked at in Fig. 9, or at the left-hand end of the cover-plate as looked at in Fig. 3. The trigger 87 has a cam-arm 88$^a$, the end of which normally engages against a lug 95$^a$ fixed on the movable bar 95 and thus locks said bar against movement. When the trigger is slightly shifted to the position shown in dotted lines in Fig. 21, as above described, the end of the trigger-cam-arm 88$^a$ is swung to a position forward of the lug 95$^a$, thus releasing the bar 95, but is left with its cam surface 88$^b$ standing in the path of a small roller 95$^b$ carried by the said lug 95$^a$. With the trigger in this position, if one of the slides 47 be moved rearwardly by means of its upstanding finger piece 48, the fixed part depending from said slide engages against the cam surface 96 on the bar 95 and acts to move said bar longitudinally toward the trigger 87 (to the left, as shown in Fig. 9; to the right, as shown in Fig. 3). This movement of the bar 95 brings the roller 95$^b$ into engagement with the cam surface 88$^b$ of the trigger-cam 88$^a$ and acts to swing said trigger in such manner as to remove its heel part 89 from its locking engagement with the lever 93. Thereupon the lever 93 may be swung so as to open the cash register drawer and perform its other functions as will later appear. Until, however, the left hand end of the lever plate 84 (located below the slot 46) is depressed, the lever 93 is blocked by means of the trigger 87. The said lever plate 84 is depressed by means of the pressure brought to bear when the clerk or other employee writes his name or other mark on the record strip. This unlocks the trigger as heretofore described. When any one of the slides 47 is moved rearwardly to partially feed the associated check strip, the movable bar 95 is caused to move longitudinally and swing the trigger so as to remove its heel from the path of the lever 93. Upon the return movement of the slide 47, the spring 99 will cause the movable bar 95 to return to its initial position, withdrawing the roller 95$^b$ and the lug 95$^a$ from the cam arm 88$^a$ of the trigger which is now free to return to its initial position. As the lever 93 is swung in its slot to accomplish its functions, it will strike a cam part 88$^c$ of the trigger, which was swung into a position across the slot when the trigger was operated by the longitudinally movable bar 95. As a result, the trigger is swung into its initial position with the end of its cam arm 88$^a$ engaged against the lug 95$^a$, and with the detent 84$^x$ on the lever plate 84 engaged with the tooth 87$^x$ on the trigger. When the lever 93 is returned to its initial position, the spring 92 interposed between the heel part and the main body of the trigger yields and permits said lever to reëngage said heel part 89. Said lever 93 thus becomes again locked against movement.

To restrain the movement of the trigger 87 and prevent it from being thrown too far when released by the lever plate 84, I prefer to provide a yielding stop, which, as shown, is a leaf spring 95$^x$ attached to the bar 95 and having engagement with the cam arm 88$^a$.

I shall now proceed to describe the mechanism operated or controlled by the lever 93, which, when it is swung forwardly as heretofore described, acts to release the cash drawer, so that it opens in a familiar manner; actuates the mechanism which feeds the record strip, that is to say, unwinds it from the supply roll 77, and winds it upon the record roll 78; and which actuates the ribbon mechanism by means of which the ribbons are unwound from one roll and rewound on a second roll.

Figure 15:
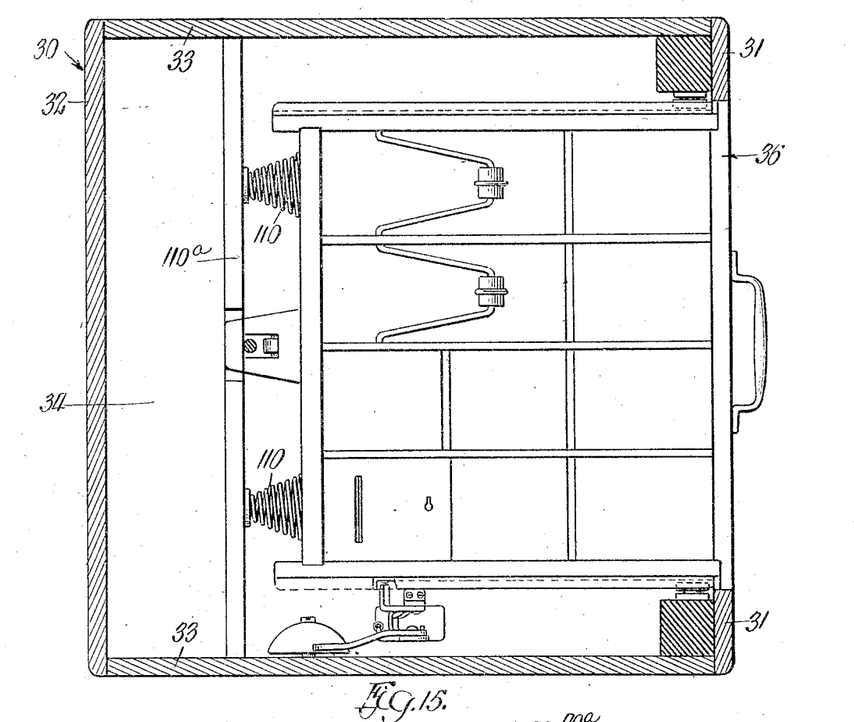
Fig. 15 is a view representing a horizontal section through the cash register in a plane indicated by the line 15—15 of Fig. 13.
Figure 16:
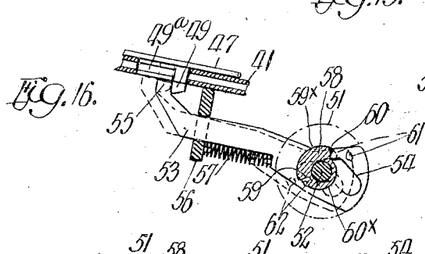
Fig. 16 is a view representing a detail section in a plane indicated by the line 16—16 of Fig. 3.
Figure 17:
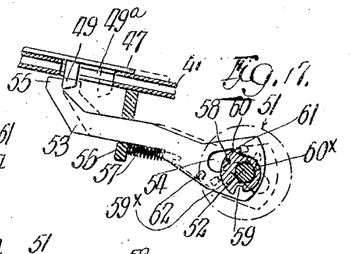
Fig. 17 is a like view, with the parts shown in a different position.
Figure 19:
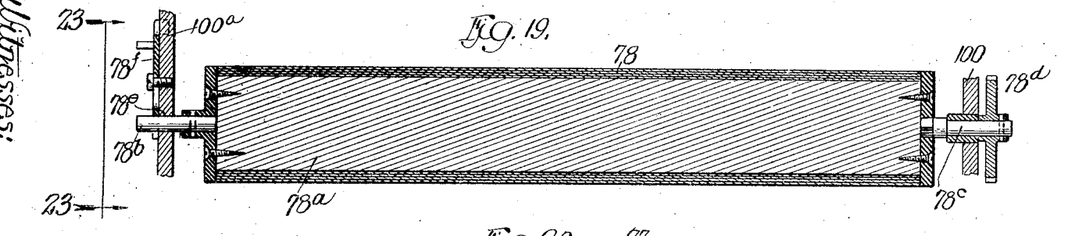
Fig. 19 is a view representing a detail section, indicated by the plane 19—19 of Fig. 13.
Figure 20:
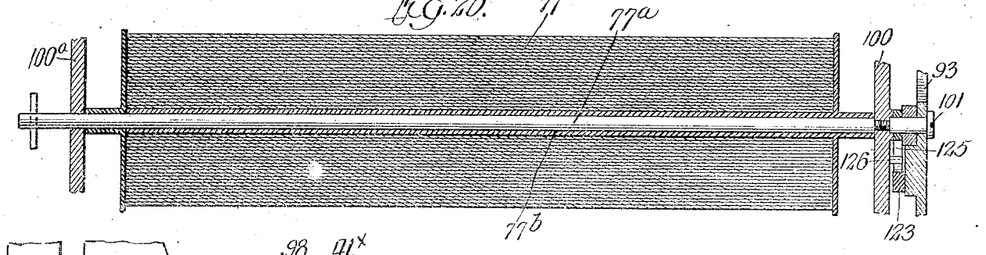
Fig. 20 is a view representing a detail section through Fig. 13 in a plane indicated by the line 20—20.

Adjacent each end of the cover plate 86, there are attached to the hinged top section 35$^b$ of the casing, bearing plates 100, 100$^a$, in which are journaled the shafts of the several ribbon rolls and of the two record rolls. The supply record roll 77 is shown wound on a flanged tubular spindle 77$^b$ (see Fig. 20), through which extends the shaft 77$^a$. Said shaft is removable to replace the supply record roll and for this purpose is inserted through an aperture in one bearing plate 100$^a$ and is threaded into the other, 100. The roll 78 is wound on a core 78$^a$ (see Fig. 19) which has a fixed stub shaft 78$^b$ at one end and a squared socket at the other end to receive the squared end of a stub-shaft 78$^c$ that is journaled in the plate 100. A ratchet-wheel 78$^d$ fixed on the stub-shaft 78$^c$ retains said stub-shaft in its bearing. The stub-shaft 78$^b$ engages in a laterally opening notch 78$^e$ in the bearing plate 100$^a$ and is retained therein by means of a yielding, vertically movable slide 78$^f$ in a familiar manner. The core 78$^a$ is thus removable so as to take off the record-strip when fully wound. The lever 93 is fulcrumed on a screw 101 (see Fig. 5) attached to the right-hand bearing plate 100, with its axis in line with that of the record supply roll shaft 77$^a$. 102 and 103 indicate the shafts on which the ribbon rolls are mounted, the latter shaft, 103, projecting beyond said bearing plate and acting as a stop for the lever 93 when said lever is in its rearwardmost position. The lever 93 has an arm 104, which depends to a point adjacent the bottom wall 34 of the register casing, where it is provided with an arcuate cam plate 105, which is adapted when the lever is swung forwardly, for releasing the cash-drawer. Said cam-plate is arranged to strike a pin 106 on a horizontally swinging spring controlled bell-crank lever 107 (see Fig. 15) which is connected by a link 108 to a crank-arm 109 which operates the cash-drawer releasing means. Said releasing means may be of any well known familiar construction, and as it forms in its details no part of the present invention, a further description of it is unnecessary. The cash-drawer 36 is spring-controlled, there being provided coiled springs 110, which are interposed between the rear end of the cash-drawer and an upright abutment wall 110$^a$, extending longitudinally across the casing. Thus, when the releasing mechanism is operated by the cam-plate 105 striking the pin 106 on the bell crank lever 107, the cash drawer is pushed forwardly out of the case by means of the springs 110 in the usual manner. The lever 93, after it has been drawn forward to release the cash drawer and to perform its other functions, is automatically returned to its initial position by means of a coiled spring 112 (see Figs. 5 and 6) which connect it to a fixed part 113 on the bearing plate 100. In order to prevent the lever 93 from returning to its initial position until after it has been caused to travel the full length of its intended movement and thus accomplish its intended functions, I provide a toothed arcuate plate 114, fixed to the bearing plate 100, with its center co-incident with the fulcrum of the lever 93. A spring controlled pivotal pawl 115 is carried by the lever and is adapted for engagement with the teeth of said plate. Said pawl is radially disposed as to the arcuate plate 114. It is pivoted on the lever at 116 and has one end connected by a spring 117 to a lug 118 on said lever, said spring to yieldingly maintain it in said radial position. The toothed plate 114 is cut away at 119, 120, corresponding to the positions of the lever at opposite ends of its stroke, so that the pawl 115 when the lever is in either of said positions will not engage with the plate 114. Intermediate said positions of the lever, the pawl 115 will engage the teeth 121 of said plate 114 and lock the lever against movement in a direction opposite to that in which it started.

123 indicates a pawl pivotally connected to the arm 104 of the lever 93. Said pawl is provided at its end with teeth 123$^a$ adapted for engagement with the ratchet-wheel 78$^d$ on the end of the shaft 78$^c$, that is connected with the core of the record-rewind roll 78. 124 indicates a coiled spring connecting said pawl 123 with the pin 118 on the lever 93 and normally holding the teeth 123$^a$ of the pawl 123 in engagement with the ratchet-wheel 78$^d$.

125$^a$ indicates an arm pivotally mounted on the fulcrum screw 101 of the lever 93.

A pin or stop 126 fixed to the bearing plate 100 engages the arm 125 and holds it in its normal position. Said arm 125 is provided with a cam surface 125$^a$ adapted for engagement with an inclined shoulder 123$^b$ on the pawl 123.

127, 128 indicate ratchet-wheels fixed on the shafts 102, 103 of the ribbon-rolls. 129, 130 indicate pawls adapted for engagement, respectively, with the said ratchet-wheels 127, 128, said pawls being pivotally mounted, respectively, at 129$^a$ and 130$^a$ on an oscillatory plate 127$^x$ which is journaled on a screw 131 fixed to the bearing plate 100. Said pawls 129, 130 are connected by springs, respectively, 129$^b$, 130$^b$ to said screw 131. Said springs tend to normally hold said pawls in engagement with their respective ratchet wheels.

132 indicates an arm pivoted on the screw 131 adjacent the oscillatory plate 127$^x$.

133 indicates a lever pivoted to the bearing-plate 100 and projecting up through a slot 94$^x$ in the fixed member 40 of the cover-plate. Said lever 133 has an extension 133$^a$ which engages with the pawl 129. Said lever carries a pin 134 which engages in a slot 135 formed in the arm 132.

133$^b$ indicates a pin or stop fixed to the bearing plate 100 engaging in an arcuate slot 133$^c$ formed in the oscillatory plate 127$^x$.

Figure 5:
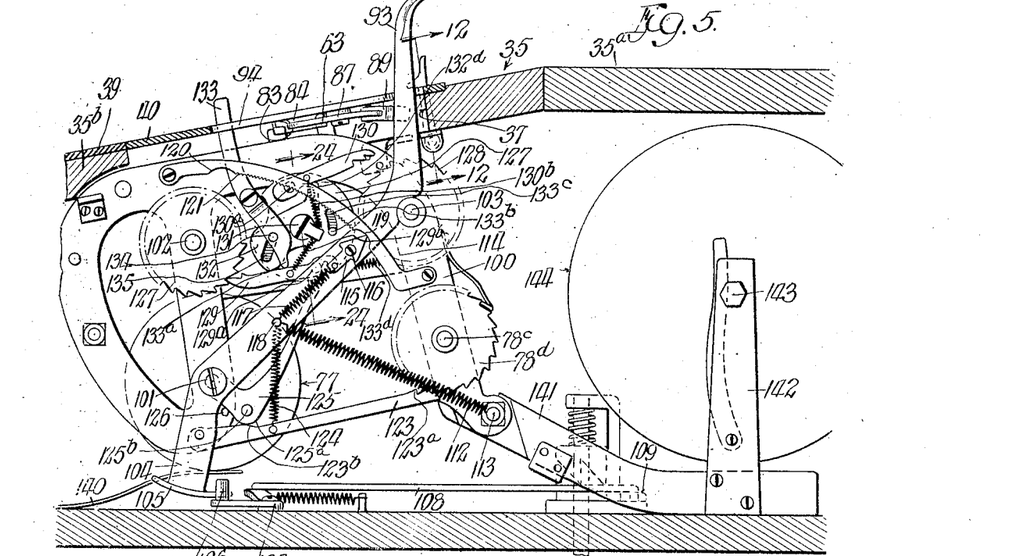
Fig. 5 is a view representing a partial vertical section through the cash register in a plane indicated by the line 5—5 of Fig. 3.
Figure 6:
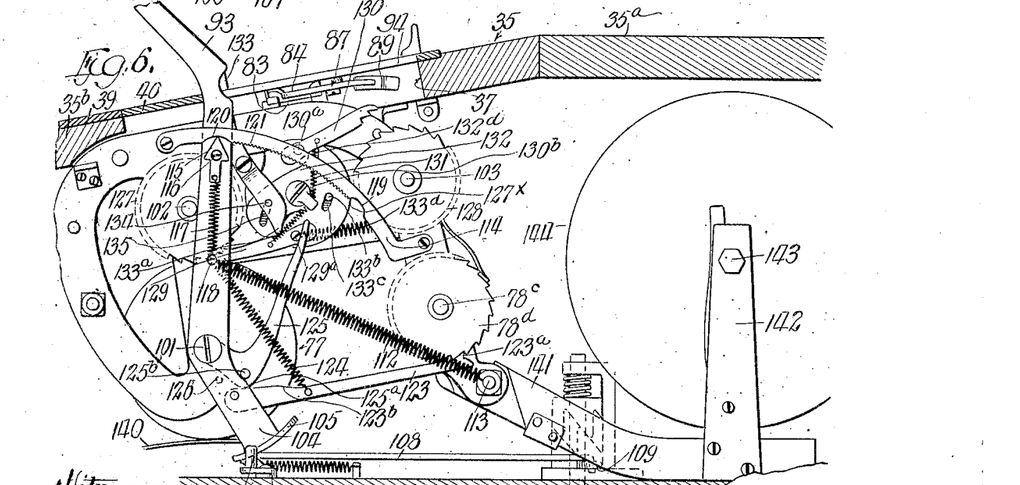
Fig. 6 is a like view, showing the parts in a different position.

133$^d$ indicates a coiled spring which connects the oscillatory plate 127$^x$ with the bearing 100 and acts to normally hold said plate in the position thereof illustrated in Fig. 5. The arm 132 has a projection 132$^a$ which engages against the pawl 130.

The construction is such that when the lever 133 is in the position indicated in the drawings, the extension 132$^a$ on the arm 132 engages the pawl 130 and holds it from operative engagement with its associated ratchet-wheel 128. When the lever 133 is swung rearwardly, it acts, by reason of the engagement of its extension 133$^a$ with the pawl 129, to disengage said pawl 129 from operative engagement with the associated ratchet wheel 127, and at the same time, by reason of the engagement of the pin 135 in the slot 134 of the arm 132, to swing said arm so as to remove its extension 132$^a$ from engagement with the pawl 130, thereby permitting said pawl to operatively engage with the associated ratchet-wheel 128. Thus, in the position of the parts referred to as illustrated, the pawl 129 is operated to actuate the ratchet-wheel 127 and rewind the ribbon on the ribbon-rolls carried by the shaft 102, while in the second position referred to, the pawl 129 is inoperative while the pawl 130 is operative to engage the ratchet wheel 128 and rewind the ribbon on the several rolls carried by the shaft 103.

The arm 125 engages a fixed part on the oscillatory plate 127 (in this case, the pivot pin 129$^a$ of the pawl 129). The arm 125 carries a pin 125$^b$, which is adapted to be struck by the arm 104 of the lever 93 when said lever is swung forwardly a sufficient amount. When the lever 93 is swung forwardly, at a certain point in the path of its movement, the arm 104 strikes the pin 125$^b$ and causes the arm 125 to swing on its fulcrum with the lever 93. Since said arm is engaged with a fixed part of the oscillating plate 127, this movement of said arm acts to swing said plate so as to actuate the pawls carried thereby and thus cause a feeding ratchet movement of one or the other set of ribbons.

The slot 94$^x$ in which the ribbon shift lever 133 swings is provided with stops 94$^y$ and 94$^z$ to engage the said lever and hold it in one or the other of its positions in a familiar manner. The ribbon shift mechanism, of course, forms no part of the present invention.

The several check-strips are fed from spools 144, loosely mounted on a shaft 143. Said shaft is carried in upright arms 142, 142$^a$, which are fixed to the end of arms 141, 141$^a$, that are hinged respectively to the bearing plates 100, 100$^a$. Said arms are capable of limited swinging movement with reference to the bearing plates 100, 100$^a$, so that when the cover-section 35$^b$ of the cash register casing, (to which the said bearing plates are attached,) is swung upwardly, the arms 141, 141$^a$ may yield upwardly to permit all the parts to be swung about the hinge of said cover section so as to disclose all of the interior apparatus to view for the purposes of renewals, repairs and the like.

The hinged cover-plate 41 is held down at its rear edge by means of spring catches 152. Said catches, as shown in the drawings (see Fig. 12) consist of hooked arms which work in suitable slots formed in the top cover section 35$^b$ adjacent the rear edge 41$^x$ of said cover-plate and are fixed to a rock-shaft 150 mounted in suitable brackets 151 attached to the bottom side of said cover section. 153 indicates a spring which normally holds said catches 152 in locked engagement with the rear marginal face of the cover-plate.

The operation of my improved cash register is apparent from the detailed description of the apparatus heretofore given. When a transaction is made, for example, a cash transaction, the clerk writes the item through the opening 42 on the check-strip 42$^a$ immediately below the same. At this time, if he attempts to move the corresponding slide 47 to feed the cash-check strip beyond the cutting edge 41$^x$ of the cover-plate, he will be unable to do so since the said slide 47 is locked against movement by reason of its engagement with the longitudinally movable bar 95, which is itself in turn locked by reason of its engagement with the trigger 87. If he attempts to operate the lever 93 to release the cash-drawer, he will also be prevented from doing so since said lever is locked against movement by the trigger 87. The clerk then writes his name, or other identifying mark on the record strip through the slot 46. This, as heretofore described, depresses the flat lever plate 84, that is to say, the depressible part of the platen, and releases the trigger 87, which, by reason of its flexible heel part, swings so as to release the bar 95. The cash-drawer operating lever 93, however, is still locked against movement by said trigger 87, and it is necessary for the employee to feed the check-strip beyond the cutting edge 41ˣ before said lever is released. After the check strip has been thus fed, the main operating lever 93 may be swung to release the cash drawer and accomplish its other functions in the manner heretofore described. Thus in my improved cash-register, it is absolutely essential that the clerk making the transaction put his identifying mark on the record-strip, and at least partially feed the record-strip before he can open the cash register.

While in describing my invention I have referred to certain details of mechanical construction and arrangement, it is to be understood that my invention is in no way limited thereby except as may be pointed out in the appended claims.

I claim as my invention:—

1. In a cash-register, in combination with a casing, a cash-drawer, means for locking the same in said casing, a platen over which a record-strip, transfer means and a check-strip are adapted to be fed, a cover-plate provided with laterally spaced openings, one to expose the check-strip and one to expose the record-strip, normally locked means for partially feeding said check-strip beyond one edge of said cover-plate, said edge constituting a cutting edge, normally locked means for releasing said cash-drawer and for feeding said record-strip, a spring controlled depressible part included in said platen located below the opening which exposes said record-strip, means operated by said depressible platen part for unlocking said check-strip feeding means, and means actuated by said check-strip feeding means for unlocking said cash-drawer releasing and recording-strip feeding means.

2. In a cash register, in combination with a casing, a cash-drawer, means for locking the same in said casing, a platen over which a record-strip, transfer-means and a plurality of laterally spaced check-strips are adapted to be fed, a cover-plate provided with a plurality of laterally spaced openings to expose said check-strip and a part of said record-strip, normally locked means associated with each check-strip for partially feeding the same beyond one edge of said cover-plate, normally locked means for releasing said cash-drawer and for feeding said record-strip, a spring controlled depressible part included in said platen located below the opening which exposes said record-strip, means operated by said depressible platen part for unlocking said several check-strip feeding means, and means actuated by each of said check-strip feeding means for unlocking said cash-drawer releasing and record-strip feeding means.

3. In a cash-register, in combination with a casing, a cash-drawer, means for locking the same in said casing, a platen over which a record-strip, transfer means and a plurality of laterally spaced check-strips are adapted to be fed, a cover-plate provided with laterally spaced openings to expose the said check-strips and said record-strip, normally locked means for partially feeding said check-strips beyond said cover-plate, a main operating lever, mechanism actuated by said lever for releasing said cash-drawer, mechanism actuated thereby for feeding said record-strip, means for locking said lever against movement, a spring controlled depressible part included in said platen located below the opening which exposes said record-strip, means operated by said depressible platen part for unlocking said check-strip feeding means, and means actuated by said check-strip feeding means for releasing said lever locking means.

4. In a cash register, in combination with a casing, a cash-drawer, means for locking the same in said casing, a platen over which a record-strip, transfer-means and a plurality of laterally spaced check-strips are adapted to be fed, a cover-plate provided with laterally spaced openings to expose said check-strips and a part of said record-strip, normally locked means for feeding said check-strips beyond said cover-plate, a main operating lever, mechanism actuated by said lever for releasing said cash-drawer, mechanism actuated by said lever for feeding said record-strip, a trigger normally locking said main lever against movement, said trigger also constituting means for locking said check-strip feeding means, said trigger being capable of an initial and of a final movement, a depressible part included in said platen located below the opening which exposes said record-strip, said depressible platen part normally locking said trigger against initial movement, said trigger when released by said depressible platen part in its initial movement releasing said check-strip feeding means without releasing said lever and means actuated by said check-strip feeding means to produce the final movement of said trigger to release said lever.

5. In a cash register, in combination with a casing, a cash-drawer, means for locking the same in said casing, a platen over which a record-strip, transfer-means and a plurality of laterally spaced check-strips are adapted to be fed, a cover-plate provided with laterally spaced openings to expose said check-strips and a part of said record-strip, means for feeding said check-strips beyond said cover-plate, a main operating lever for releasing said cash-drawer and for feeding said record-strip, a trigger capable of an initial and of a final movement, said trigger acting to lock said main operating lever against movement until given its final movement, a movable member normally acting to lock said several check feeding means against movement, said member being held against movement until said trigger has had its initial movement, a spring controlled depressible part included in said platen located below the opening which exposes said record-strip, said depressible platen part normally locking said trigger against initial movement, and said movable member which acts to lock said check-strip feeding means until the trigger has been given its initial movement, acting to produce the final movement of said trigger to release the main operating lever when any one of said check-strip feeding means is actuated.

6. In a cash register, in combination with a platen over which a record-strip and a plurality of laterally spaced check-strips together with transfer means are adapted to be fed, a cover-plate provided with openings to expose said check-strips and a part of said record-strip, devices associated with each check-strip for partially feeding the same, a spring-controlled, movable bar normally locking said check-strip feeding devices against movement, means interposed between said check-strip feeding devices and said bar for moving said bar when it is released, a main operating lever, a trigger capable of an initial and of a final movement, said trigger acting to lock said main operating lever until its final movement and to lock said bar until its initial movement has been accomplished, a spring controlled, depressible platen part included in said platen, said platen part acting to lock said trigger against initial movement until depressed, said bar when moved by said check-strip feeding devices acting to produce the final movement of said trigger to release the main operating lever, and said trigger having a part adapted to be struck in the operation of said main lever to return the trigger to its normal position.

7. In a cash register, in combination with a platen over which a record-strip, transfer-means and a plurality of laterally spaced, superposed check-strips are adapted to be fed, a cover-plate provided with openings to expose said check-strips and a part of said record-strip, a slide attached to said cover-plate and movable thereon associated with each check-strip, means for feeding said check-strip operated by said slide, a spring controlled longitudinally movable bar normally locking said slides against movement, means intermediate each of said slides and said bar for moving said bar when the same is released, a main operating lever, a trigger capable of an initial and of a final movement, said trigger acting to lock said main operating lever until its final movement has been accomplished and to lock said bar until its initial movement has been accomplished, means intermediate said bar and said trigger for producing the final movement of said trigger after said trigger has accomplished its initial movement, a spring-controlled, depressible platen part included in said platen adapted to lock said trigger against initial movement until said platen is depressed and means for producing the initial movement of said trigger.

8. In a cash register, in combination with a platen over which a record-strip and a plurality of laterally spaced check-strips together with transfer means are adapted to be fed, a cover-plate provided with openings to expose said check-strips and a part of said record-strip, a main operating lever, a trigger for locking said main lever against movement, said trigger including a movable heel-part which directly engages said lever and a resilient member acting between said heel part and the main part of said trigger adapted to produce an initial movement of said trigger, a depressible platen part included in said platen and having a pawl which normally engages said trigger to lock the same against its initial movement, a member for actuating said trigger to produce its final movement to release the main lever, said member being locked by said trigger against movement until the initial movement of said trigger has been accomplished and feeding devices associated with each check-strip normally locked against movement by said trigger actuating member and adapted to operate said trigger actuating member when the same is released in the initial movement of said trigger.

9. In a cash register, means for partially feeding a check-strip, comprising in combination with a feed-roll, a friction device for maintaining the check-strip in frictional engagement therewith, and a shaft on which said feed-roll is mounted, a cam fixed to said feed-roll with its axis concentric therewith, said cam having a notch and a shoulder circumferentially spaced apart and having oppositely disposed curved cam surfaces of different radii between said notch and shoulder, an operating member movable in a plane adjacent to said cam, said operating member having a lug normally engaged in said cam notch, and a second lug adapted to engage said cam shoulder after the first named lug has been withdrawn from engagement with said cam notch by the movement of said operating member to feed the check-strip, and means for guiding said second named lug in a path to engage said cam shoulder through a predetermined distance.

10. In a cash register, means for feeding a check-strip including, in combination with a feed-roll, a friction device for maintaining the check-strip in frictional engagement therewith and a shaft on which said feed-roll is mounted, a cam fixed to said feed-roll with its axis concentric therewith, said cam having a notch and a shoulder circumferentially spaced apart and having oppositely disposed, curved cam surfaces of different radii between said notch and shoulder, a spring controlled, longitudinally movable operating member mounted in a plane adjacent to said cam, said operating member having a lug normally engaged in said cam notch and a second lug adapted to engage said cam shoulder to rotate the cam after the first named lug has been withdrawn from the cam notch in the movement of said operating member to feed said check-strip and said operating member having a slot through which said shaft extends, said slot being formed to guide said second named lug in a path to engage said cam shoulder through a predetermined distance.

In testimony, that I claim the foregoing as my invention I affix my signature in the presence of two witnesses, this third day of July A. D. 1913.

JOSHUA L. MORRIS.

Witnesses:
OLAF OLSEN,
WM. F EDELFSON.